United States Patent
Gupta et al.

(10) Patent No.: US 9,953,096 B2
(45) Date of Patent: Apr. 24, 2018

(54) SYSTEM TO STORE USER SELECTION AND PROVIDE EASY RETRIEVAL AND TRAVERSAL

(71) Applicant: International Business Machines Corporation, Armonk, NY (US)

(72) Inventors: Saurabh Gupta, Nashua, NH (US); Sandeep Perumbuduri, Morrisville, NC (US); Nancy A. Schipon, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 294 days.

(21) Appl. No.: 14/751,657

(22) Filed: Jun. 26, 2015

(65) Prior Publication Data
US 2016/0378878 A1    Dec. 29, 2016

(51) Int. Cl.
*G06F 7/00*     (2006.01)
*G06F 17/30*    (2006.01)

(52) U.S. Cl.
CPC .. *G06F 17/30884* (2013.01); *G06F 17/30876* (2013.01)

(58) Field of Classification Search
CPC ................................................. G06F 17/30876
See application file for complete search history.

(56) References Cited

U.S. PATENT DOCUMENTS

| | | | |
|---|---|---|---|
| 7,725,836 B2 | 5/2010 | Moehrle | |
| 8,433,996 B2 | 4/2013 | Paulsami et al. | |
| 2009/0199106 A1* | 8/2009 | Jonsson | G06F 17/30884 715/744 |
| 2012/0159368 A1 | 6/2012 | Negrillo et al. | |
| 2014/0282118 A1 | 9/2014 | Kumamoto | |

* cited by examiner

*Primary Examiner* — Ajith Jacob
(74) *Attorney, Agent, or Firm* — Michael A. Petrocelli (57) ABSTRACT

A computer implemented method and system for organizing file location bookmarks of navigations within corresponding applications. A plurality of navigation histories relating to an application are captured, in response to a user navigating a file system using an application and selecting resource locations within corresponding directories of the file system for saving. The selected locations of the navigation history are displayed on a user interface (UI) of the computer. The selected locations of the navigation history are updated and displayed, responsive to the selections of the user.

6 Claims, 5 Drawing Sheets

SYSTEM TO STORE USER SELECTION AND PROVIDE EASY RETRIEVAL AND TRAVERSAL

BACKGROUND

The present disclosure relates to a method and system for selectably saving resource locations in a file system of a computer. A user can browse through file system resources on a computer or using a computer communicating with a network (e.g., a local area network or a wide area network) to reach a directory of interest or which contains a desired resource. In one example, the file locations can be stored so that a record of opened files can be displayed, for example, as a drop down menu. In another example, a user can use a web browser running on a computer to navigate the Internet. Many URLs (Uniform Resource Locator) can be recorded in the user's browser history. In one instance, these URLs can be displayed as a list.

The process of browsing through a file system can be repeated many time in a day while a user performs many tasks on a computer and can involve opening different resources from different directories. Further, a user may open a number of directories simultaneously at any given time to access resources of interest. A user may switch between different directories, or go forward and backward in open directories to access desired resources.

In one example, a user may need to access resources from many different directories. One option for the user is to open many different windows and switches between windows. This approach can become confusing and cumbersome. Another option is to use a history address bar (typically provided in a browser). This option requires the user to access the address bar and select a previously used address, which can also become cumbersome and confusing. Another option is for the user to use a directory program which provides a directory tree (typically offered with an operating system or by another program), or a hierarchical menu. The directory tree can show hard drives and other storage resources, and folders and files within a storage device. An address or location can be selected within the directory or menu. However, this option provides many directories, subdirectories and files, which can also become cumbersome and confusing for the user.

SUMMARY

In one aspect of the present disclosure, a computer implemented method organizes file location bookmarks of navigations within corresponding applications. A plurality of navigation histories relating to an application are captured, in response to a user navigating a file system using an application and selecting resource locations within corresponding directories of the file system for saving. The selected locations of the navigation history are displayed on a user interface (UI) of the computer. The display of the selected locations of the navigation history are updated, responsive to the selections of the user.

In another aspect of the present disclosure, a computer program product for organizing file location bookmarks of navigations within corresponding applications in provided. The computer program product comprising a computer readable storage medium having program instructions embodied therewith, wherein the computer readable storage medium is not a transitory signal per se, the program instructions executable by a computer to cause the computer to perform a method, comprising: capturing a plurality of navigation histories relating to an application, in response to a user navigating a file system using an application and selecting resource locations within corresponding directories of the file system for saving; displaying the selected resource locations of the navigation history on a user interface (UI) of the computer; and updating the display of the selected resource locations of the navigation history, responsive to the selections of the user.

In another aspect of the present disclosure, a computer system for organizing file location bookmarks of navigations within corresponding applications is provided, the computer system comprising: one or more computer processors, one or more computer-readable storage media, and program instructions stored on one or more of the computer-readable storage media for execution by at least one of the one or more processors, the program instructions, comprising: capturing a plurality of navigation histories relating to an application, in response to a user navigating a file system using an application and selecting resource locations within corresponding directories of the file system for saving; displaying the selected resource locations of the navigation history on a user interface (UI) of the computer; and updating the display of the selected resource locations of the navigation history, responsive to the selections of the user.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
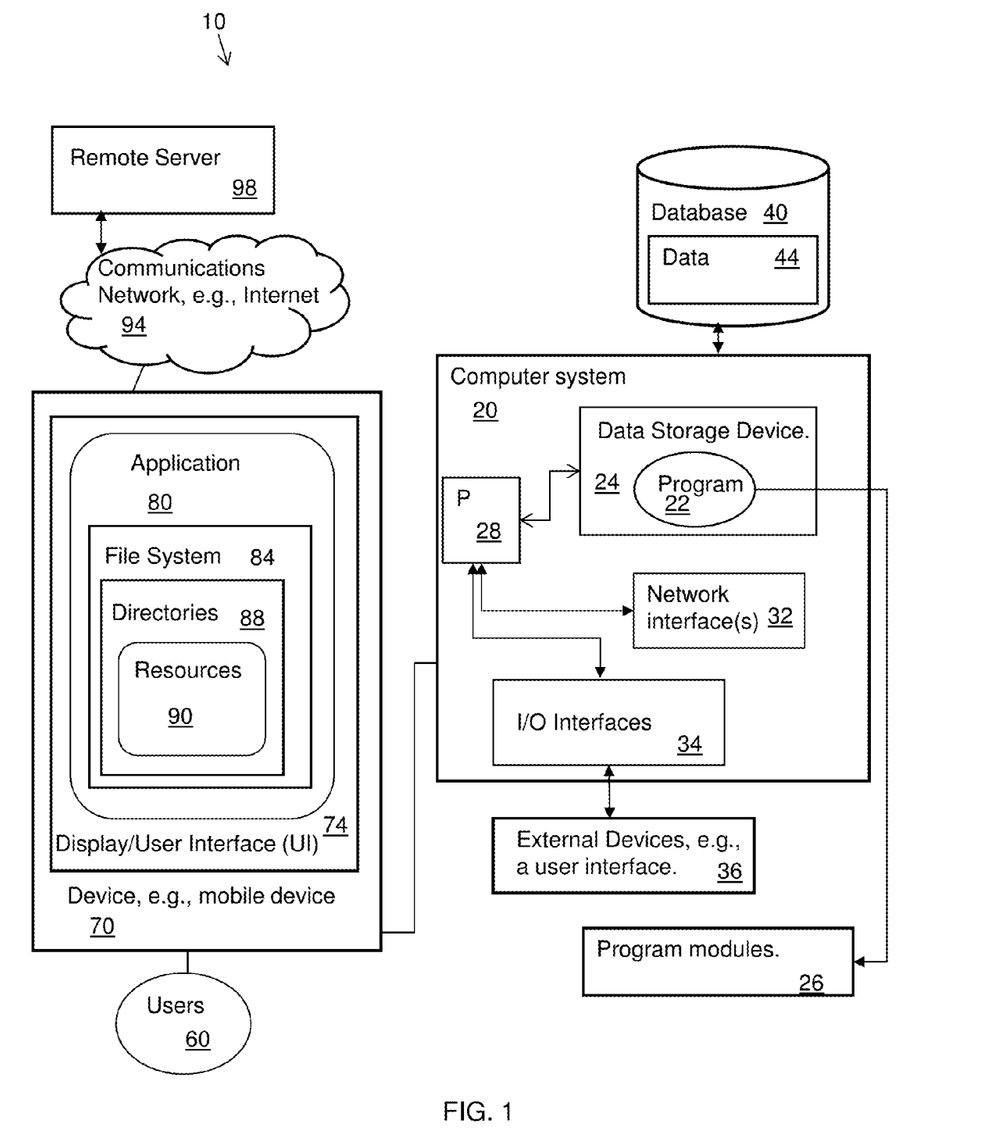
FIG. 1 is a schematic block diagram illustrating an overview of a system and methodology for a computer implemented method for organizing file location bookmarks of navigations within corresponding applications according to an embodiment of the disclosure.
Figure 2:
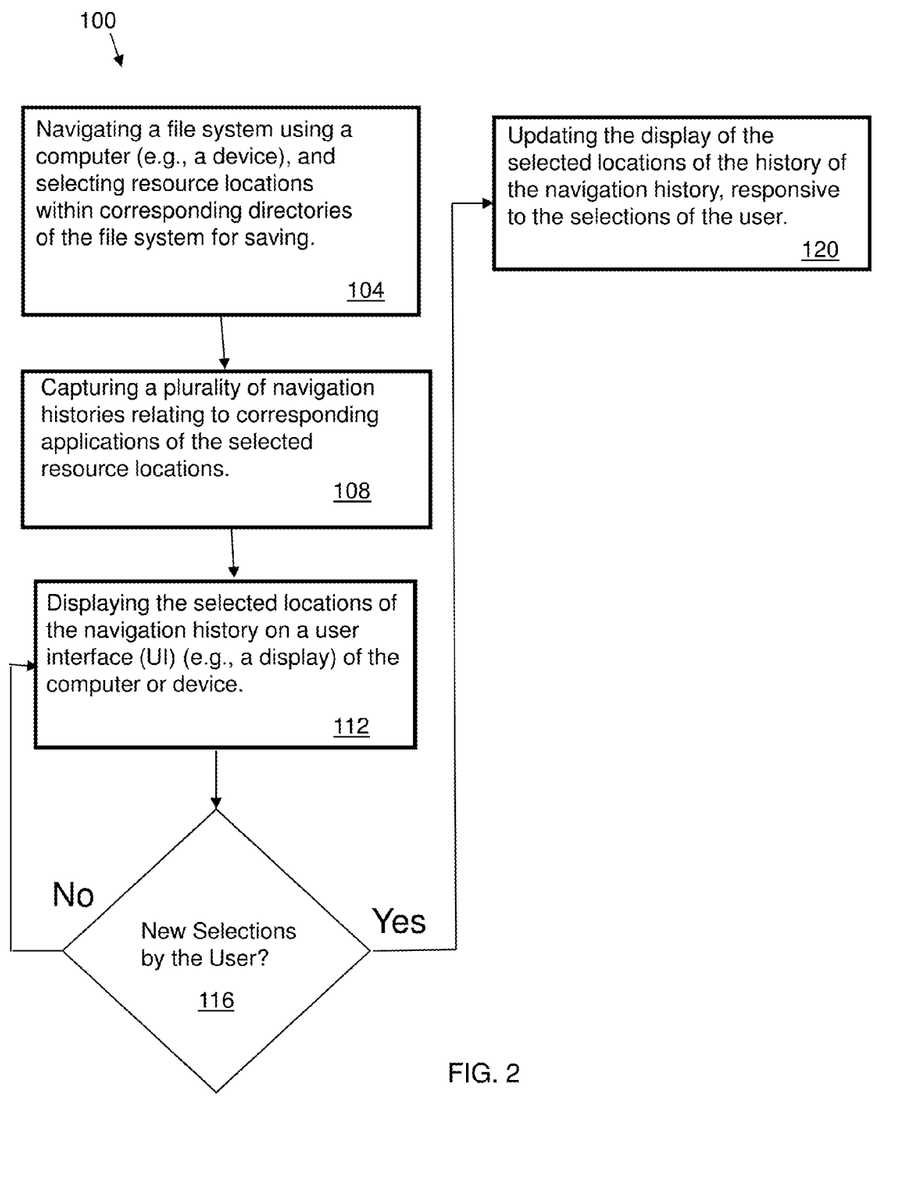
FIG. 2 is a flow chart illustrating a method for organizing file location bookmarks of navigations within corresponding applications based on FIG. 1 according to an embodiment of the disclosure.

Referring to FIGS. 1 and 2, a computer implemented method 100 and system 10 according to an embodiment of the present disclosure includes organizing saved resource locations of navigations within an application, for instance using bookmarks or placeholders. The bookmarks can also be referred to as saved locations or resources, placeholders, or a pin, and generically refers to any technique of saving a resource location for future selection, for example, how a bookmark typically is used. An application can refer to any file system which is used to access resources and can include accessing directories. The resources can be URLs (Uniform Resource Locators) accessed using a web browser on the World Wide Web, or a program for accessing resources or files on a storage device (e.g., a hard drive), including a remote server that can be part of a network (for example, a local area network, or wide area network, or accessed through the Internet).

A user 60 can open an application 80 for searching file directories using a device 70 having a display 74. The application 80 enables the user to view a file system 84, directories 88, and resources 90 on the device 70.

For example, the device 70 includes a computer 20. The device 70 can be a mobile device, or another type of computer device. The device 70 includes a display 74 which is viewable by the user 60, and the display defines a display area. The display area refers to the area designated by the device which is viewable by the user. The device includes the application 80 which can access the communications network 94 (e.g., the Internet, a local network or wide area network) to communicate with a remote server 98.

A mobile device is one embodiment of a device having a computer or computer system 20, which is depicted generically in FIG. 1. Other devices having a computer or described as a computer or computer system may include, for example, a Personal Data Assistant (PDA), a cell phone, or a notebook, a desktop computer, or the like. The device in the present disclosure can be configured to send and receive electronic communications. The computer system 20 is a generic representation of a computer which may be embodied in a device such as a hand held device, or can also represent a server for providing the method of the present disclosure as a service which can be accessible using the Internet or a network.

Multiple directories can be open simultaneously in response to the user accessing resources 90 through the directories 88 of the file system 84. Such directories can be overlapping, minimized, and can require the user to toggles between dialog boxes.

Figure 3:
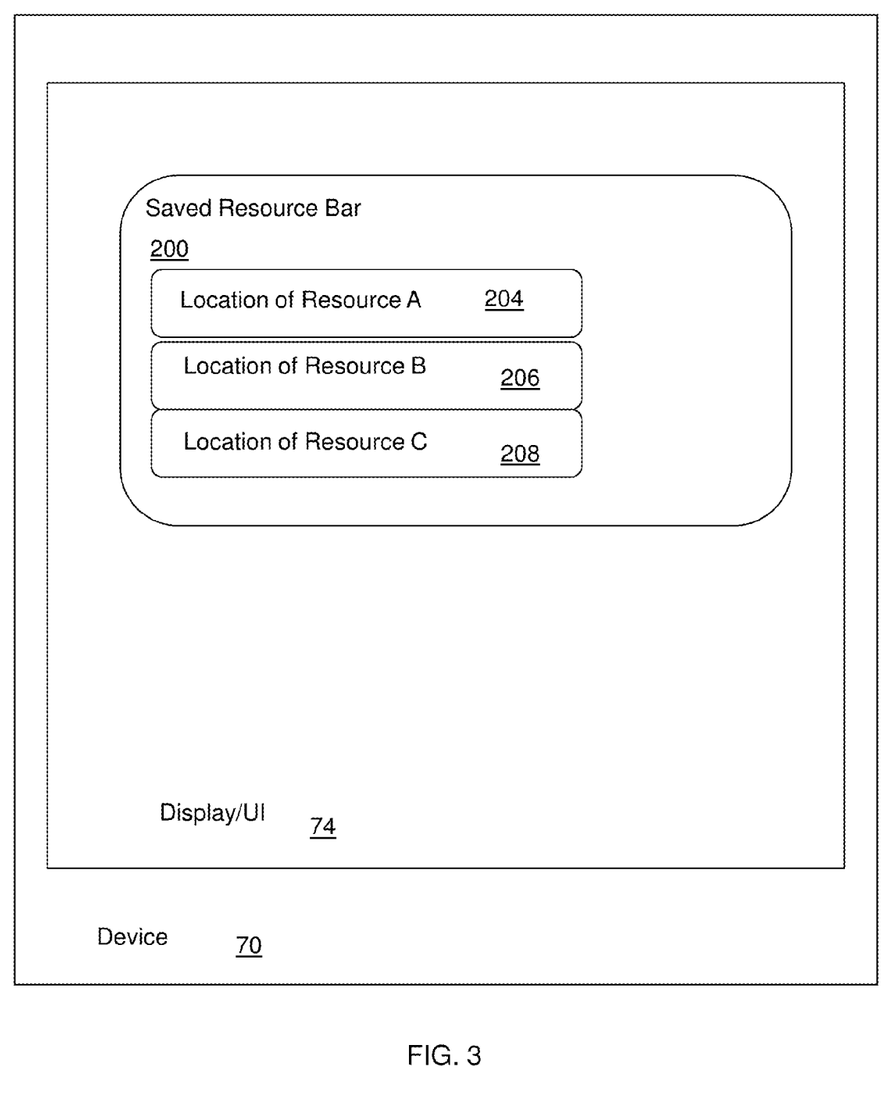
FIG. 3 is a schematic block diagram illustrating a saved resource bar on a display of a device according to an embodiment of the disclosure.

A plurality of navigation histories relating to corresponding applications can be captured, in response to a user navigating a file system using a corresponding application and selecting resource locations within corresponding directories of the file system for saving. Referring to FIG. 2, a user navigates a file system using a corresponding application and selecting resource locations within corresponding directories of the file system for saving, as in block 104. The plurality of selected navigation histories are captured which relate to the corresponding applications of the selected resource locations, as in block 108. Referring to FIG. 3, according to an embodiment of the disclosure, a plurality of navigation histories are captured using a saved resource bar 200.

The saved resource bar (or resource bar) 200 displays the selected locations of the navigation history on a user interface (UI) or display 74 of the device 70, as in block 112. For example, the location of resource A 204 is shown in the saved resource bar 200 as shown in FIG. 3. In one example, referring to FIG. 3, the resource bar 200 shows a location of resource A 204, resource B 206, and resource C 208, which are saved locations, saved by the user.

The display of the selected locations of the navigation history is updated as in block 120, responsive to the selections of the user, as in block 116. The selected locations can be dynamically added on the resource bar such that the list increases. The selected locations of the navigation history can be displayed to the user as the resource bar dynamically adjusts to the number of selected locations.

The selected locations of the navigation history can be from a plurality of applications, in response to the user navigating in the plurality of applications. Thus, the selected locations are displayed at one location, the resource bar, when the selected locations are from multiple applications. Thus, the user can directly access a location, regardless of the application, without going to multiple applications or dialog boxes to retrieve resource.

Figure 4:
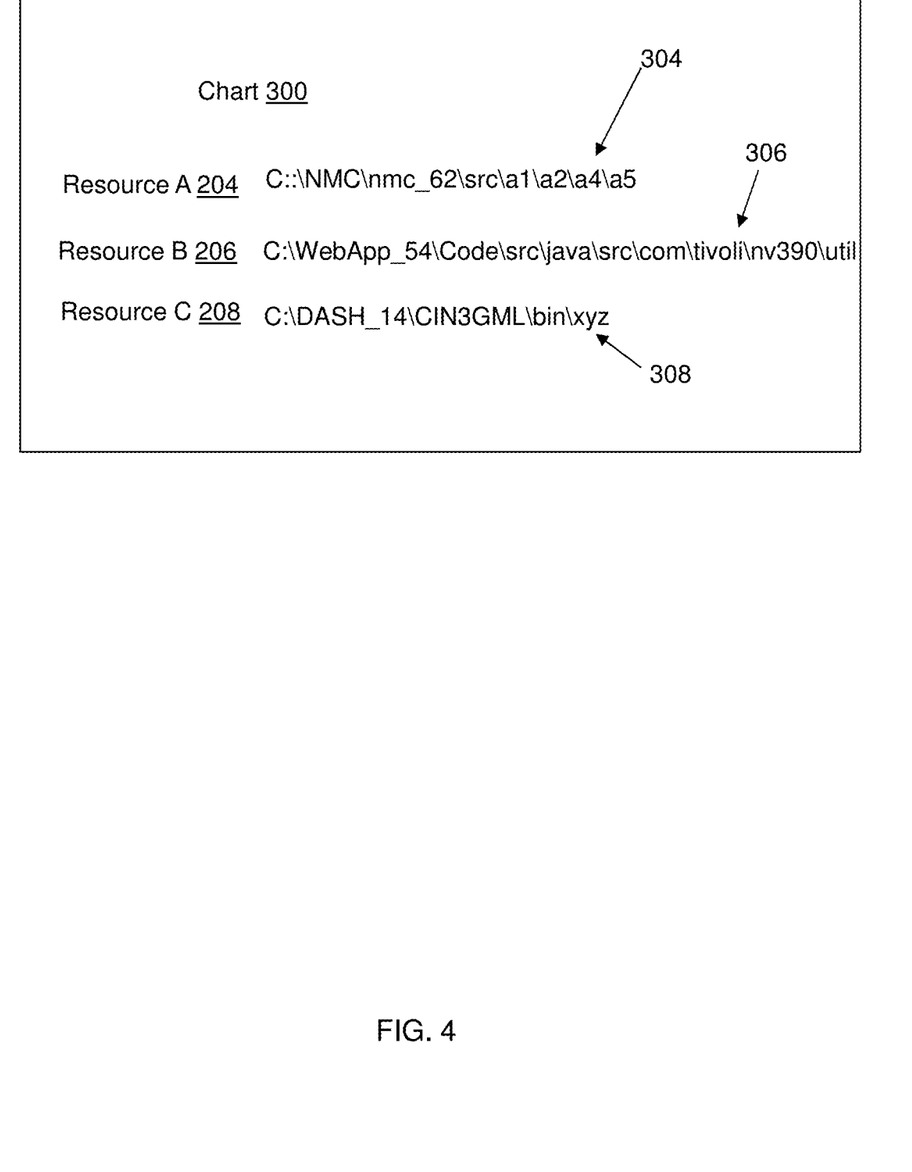
FIG. 4 is a chart showing resource locations referred to in FIG. 3 in accordance with an embodiment of the disclosure.

The selected locations of the navigation history can be part of the resource bar 200, as shown in FIGS. 3 and 4. The resource bar 200 displays the selected locations and is movable within a display area of the display. For example, the user can detach the resource bar from a current application being used to navigate a file system, and move the resource bar to another location in a display area of the display. Thereby, the user can locate the resource bar anywhere on the display 74 and access saved resources by selecting save resource locations regardless of the application the user is currently using.

In one example, referring to FIG. 4, a chart 300 includes example locations. The examples include resource A 204, resource B 206, and resource C 208, each have a resource file location, exemplified as file locations or paths 304, 306, and 308, respectively, which refer to respective locations which indicate, in the present example, a C drive, directories, and a file or resource.

Thus, the present disclosure provides a resource bar which lists the saved resource locations, which can be directly selected and returned to. In contrast, a tree like depiction of a resource is not necessary, and the user can directly return to a resource by selecting from the save list in the resource bar. Once the user has selected a resource location to save in the resource bar, the resource location can be accessed in the resource bar, selected, and the user can directly return to a previous location. As shown in FIG. 4, example resources A 204, B 206, C 208 each have addresses indicating locations or paths 304, 306, 308 of each of the resources, respectively. The user does not have to navigate through directories, or a tree-like depiction of directories, or go through recently accessed file addresses. The user can go to a drop down menu or a separable dialog box embodied as the saved resource bar 200 which provides a selectable resource location for direct and fast access to the user's saved resources.

The resource bar can be part of an existing application or an add-on application. The resource bar can be detached from the user current application and moved on the display of the device, and can be positioned in overlapping relation to another application. Thus, the user has the saved resource locations in the resource bar at their disposal no matter which application is currently viewed on the device.

The present disclosure provides a user selected history of a file system. The last saved resource location can be highlighted. Further, the resource bar can be automatically updated as the user saves new resource locations. Also, the resource bar can be detached from a current window or application being used to search a file system, and be moved as a separate window which captures all of the user's saved resource locations.

The method 100 can be part of an application and thus stand alone, or an add-on application working with an application used for searching file systems. The method can be run locally on a device such as the mobile device, or can be run a service, for instance, on a remote server 98 which can be accessed using a communications network 94.

Figure 5:
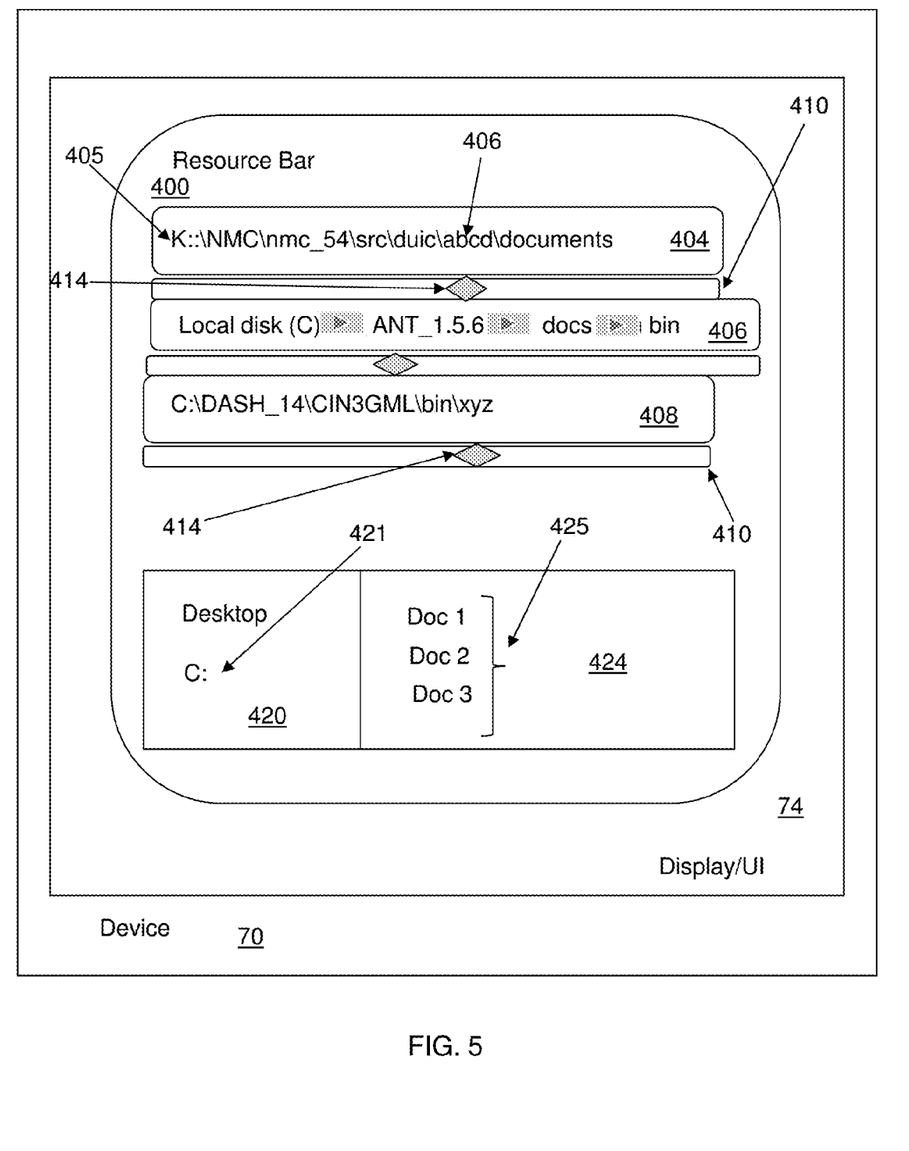
FIG. 5 is a schematic block diagram of a resource bar with a slidable bar according to an embodiment of the disclosure.

Referring to FIG. 5, in one embodiment of the disclosure a resource bar 400 shows locations of files 404, 406, 408, and a movable positioning element embodied as a slidable bar 414 is under the locations and slidable along a track 410. For example, location 404 indicates a file location on a remote drive, K 405. In this example, the slidable bar 414 is positioned under the resource location, and under a directory indicated in the resource location, in this example, abcd 406. The slidable bar 410 is positionable along the length of the resource bar 400 and thus under any directory in the resource location 404, 406, 408.

In the example shown in FIG. 5, relating to the resource location 408, the directory C 421 is shown in a directory display or directory display area 420 and the files 425 are shown in a file display or file display area 424 beneath the resource locations as part of the resource bar 400. Specifically, the slidable bar 414 is positionable beneath the resource location 408, and beneath the xyz 409 location or directory of the resource location 408. Documents DOC 1, DOC 2, DOC 3 425 are shown in the display area 424 as in the directory xyz 409. In another example, location 404 indicates a file location on a K drive 405 which refers to a remote storage device, e.g., a remote server 98. When the slidable bar 414 is activated by a user, and moved to a corresponding location or directory beneath a resource location, the resource bar dynamically adjusts the directory display 420 and the file display 424 to correspond to the directory of the resource location aligned with the slidable bar 414. Thereby, the directory and files displayed in corresponding areas 420, 424, correspond to the directory under which the slidable bar is positioned.

The resource bar thus provides easy navigation over the complete path of stored history location using the sliding bar. The resource bar thus provides a user a direct mechanism to dynamically show a history of resource locations including directories and files simultaneously. That is, the full path or resource location is shown in a complete form without losing the display of the resource location, and one or more directories and files (as shown in the directory area 420 and file area 424 in FIG. 5), thus providing the resource location, directory and files simultaneously and dynamically to the user. Thus is provided a system and method for a user to navigate quickly within selected stored resources. The present disclosure thus provides the user the ability to retrieve multiple stored resources selection and access them in a single window or display area represented by the resource bar 400.

Further, other sorting embodiments can be used for display areas 420, 424, for example, a user can set or select rules for displaying a directory and files as shown in FIG. 5 or for other display configurations. Also, the resource locations can be displayed in a time opened order or according to another rule as designated by the user, such as frequency of visits, or by dragging and dropping into position.

The resource bar can be part of an existing file system window (provided by an application), or can be provided as a separate window (provided by a separate application or as part of an add-on application). As discussed above, the resource bar can be detached from a current application and moved on the display of the device, and can be positioned in overlapping relation to another application. Thus, a user has the saved resource locations in the resource bar displayed for reference and usable for retrieval of documents or to return to a URL without toggling between multiple applications or dialog boxes, or returning to a previous screen by selecting directories on a tree and losing a full display of a location. The present disclosure thus provides a dynamic display of resource location histories as discussed above.

In one embodiment according to the present disclosure, the method 100 may be embodied in a program 22 (FIG. 1) embodied on a computer readable storage device, e.g., data storage device 24. The program 22 is executable by a processor 28 of a computer system 20 (to execute program steps, code, or program code). Additional data storage may also be embodied as a database 40 including data 44. The program or executable instructions may be offered as a service by a provider. The computer 20 and program 22 shown in FIG. 1 are generic representations of a computer and program that may be local to a user, or provided as a remote service, such as website accessible using a network (e.g., interacting with the Internet or cloud services). It is understood that the computer 20 also generically represents herein a computer device or a computer included in a device, such as a laptop or desktop computer, etc., or one or more servers, alone or as part of a datacenter. The computer system 20 can include a network interface 32, and input/output (I/O) interface(s) 34. The I/O interface 34 allows for input and output of data with an external device 36 that may be connected to the computer system. The network interface 32 may provide communications between the computer system and a computer network. The method steps and system components and techniques may be embodied in modules of the program 22 for performing the tasks of each of the steps of the method and system, which are generically represented in FIG. 1 as program modules 26. The program 22 and program modules 26 can execute specific steps, routines, sub-routines, instructions or code, of the program. The method of the present disclosure can be run locally on a device such as the mobile device, or can be run a service, for instance, on a remote server 98 which is accessed using the communications network 94.

It is understood that a computer or a program running on the computer may communicate with a server computer via a communications network. The communications network may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

Referring to FIG. 1, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The embodiments, features, and instructive examples described above are illustrative, and should not be construed to limit the present disclosure to the particular embodiments or enumerated examples. Thus, various changes and modifications may be effected by one skilled in the art without departing from the spirit or scope of the disclosure as defined in the appended claims.

What is claimed is:

1. A computer implemented method for organizing file location bookmarks of navigations within corresponding applications, comprising:
    capturing a plurality of navigation histories relating to an application communicating with a computer, in response to a user navigating a file system using an application and selecting for saving resource locations within corresponding directories of the file system, wherein the selected resource locations of the navigation history are from a plurality of corresponding applications, in response to the user navigating in the plurality of applications, wherein the selected resource locations of the navigation history dynamically adjusts to a number of selected resource locations;

displaying the selected resource locations of the navigation history on a user interface (UI) of the computer, the selected resource locations being displayed as part of a resource bar which on the user interface and the resource bar is movable within a display area of a display communicating with the computer;

updating the display of the selected resource locations of the navigation history, responsive to the selections of the user; and displaying a directory or file indicated in a resource location of the selected resource locations, in response to aligning, in the resource bar, a movable positioning element with the indicated resource location, wherein the movable positioning element and the corresponding directory and/or file are displayed in the display area being part of the resource bar which displays the selected resource locations.

2. The method of claim 1, wherein the movable positioning element is located beneath the indicated resource location, and the corresponding display area for displaying the directory or the file of the indicated resource location is located beneath the indicated resource locations and in the resource bar.

3. A computer program product for organizing file location bookmarks of navigations within corresponding applications, the computer program product comprising a computer readable storage medium having program instructions embodied therewith, wherein the computer readable storage medium is not a transitory signal per se, the program instructions executable by a computer to cause the computer to perform a method, comprising:

capturing a plurality of navigation histories relating to an application communicating with a computer, in response to a user navigating a file system using an application and selecting for saving resource locations within corresponding directories of the file system, wherein the selected resource locations of the navigation history are from a plurality of corresponding applications, in response to the user navigating in the plurality of applications, wherein the selected resource locations of the navigation history dynamically adjusts to a number of selected resource locations;

displaying the selected resource locations of the navigation history on a user interface (UI) of the computer, the selected resource locations being displayed as part of a resource bar which on the user interface and the resource bar is movable within a display area of a display communicating with the computer;

updating the display of the selected resource locations of the navigation history, responsive to the selections of the user; and displaying a directory or file indicated in a resource location of the selected resource locations, in response to aligning, in the resource bar, a movable positioning element with the indicated resource location, wherein the movable positioning element and the corresponding directory and/or file are displayed in the display area being part of the resource bar which displays the selected resource locations.

4. A computer system for organizing file location bookmarks of navigations within corresponding applications, the computer system comprising:

one or more computer processors, one or more computer-readable storage media, and program instructions stored on one or more of the computer-readable storage media for execution by at least one of the one or more processors, the program instructions, comprising:

capturing a plurality of navigation histories relating to an application communicating with a computer, in response to a user navigating a file system using an application and selecting for saving resource locations within corresponding directories of the file system, wherein the selected resource locations of the navigation history are from a plurality of corresponding applications, in response to the user navigating in the plurality of applications, wherein the selected resource locations of the navigation history dynamically adjusts to a number of selected resource locations;

displaying the selected resource locations of the navigation history on a user interface (UI) of the computer, the selected resource locations being displayed as part of a resource bar which on the user interface and the resource bar is movable within a display area of a display communicating with the computer;

updating the display of the selected resource locations of the navigation history, responsive to the selections of the user; and displaying a directory or file indicated in a resource location of the selected resource locations, in response to aligning, in the resource bar, a movable positioning element with the indicated resource location, wherein the movable positioning element and the corresponding directory and/or file are displayed in the display area being part of the resource bar which displays the selected resource locations.

5. The computer program product of claim 3, wherein the movable positioning element is located beneath the indicated resource location, and the corresponding display area for displaying the directory or the file of the indicated resource location is located beneath the indicated resource locations and in the resource bar.

6. The system of claim 4, wherein the movable positioning element is located beneath the indicated resource location, and the corresponding display area for displaying the directory or the file of the indicated resource location is located beneath the indicated resource locations and in the resource bar.

* * * * *